(12) United States Patent
Van Der Merwe et al.

(10) Patent No.: US 11,485,508 B2
(45) Date of Patent: Nov. 1, 2022

(54) TURBINE ENGINE ASSEMBLY AND METHOD OF MANUFACTURING THEREOF

(71) Applicant: General Electric Company, Schenectady, NY (US)

(72) Inventors: Gert Johannes Van Der Merwe, Lebanon, OH (US); Charles Stanley Orkiszewski, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 217 days.

(21) Appl. No.: 16/667,319

(22) Filed: Oct. 29, 2019

(65) Prior Publication Data

US 2020/0062412 A1 Feb. 27, 2020

Related U.S. Application Data

(63) Continuation of application No. 14/943,653, filed on Nov. 17, 2015, now Pat. No. 10,518,891.

(Continued)

(51) Int. Cl.
| | |
|---|---|
| *B64D 27/26* | (2006.01) |
| *F01D 25/04* | (2006.01) |
| *F01D 25/16* | (2006.01) |
| *F01D 5/10* | (2006.01) |
| *B64D 27/10* | (2006.01) |
| *B64D 29/00* | (2006.01) |

(Continued)

(52) U.S. Cl.
CPC ............. *B64D 27/26* (2013.01); *B64D 27/10* (2013.01); *B64D 29/00* (2013.01); *B64D 35/02* (2013.01); *F01D 5/10* (2013.01); *F01D 15/12* (2013.01); *F01D 25/04* (2013.01); *F01D 25/164* (2013.01); *F01D 25/24* (2013.01); *B64D 2027/262* (2013.01); *F05D 2220/30* (2013.01); *F05D 2230/60* (2013.01); *F05D 2240/60* (2013.01); *F05D 2260/4031* (2013.01); *Y02T 50/60* (2013.01)

(58) Field of Classification Search
CPC .......... B64D 27/26; B64D 27/10; B64D 29/00
See application file for complete search history.

(56) References Cited

U.S. PATENT DOCUMENTS

| | | | |
|---|---|---|---|
| 2,722,391 A | 11/1955 | Krieghoff | |
| 3,322,379 A * | 5/1967 | Flannelly | F16F 7/1022 248/559 |

(Continued)

FOREIGN PATENT DOCUMENTS

| | | |
|---|---|---|
| EP | 2025898 | 2/2009 |
| WO | 2013150229 | 10/2013 |

OTHER PUBLICATIONS

A European Search Report and Opinion issued in connection with EP Application No. 15195701.6 dated May 2, 2016.

*Primary Examiner* — Michael H Wang
(74) *Attorney, Agent, or Firm* — Venable LLP; Elizabeth C. G. Gitlin; Michele V. Frank

(57) ABSTRACT

A turbine engine assembly includes: a fan assembly; a turbine coupled to the fan assembly through a gearbox; a stationary component; and an assembly extending between the gearbox and the stationary component to couple the gearbox to the stationary component, wherein the assembly includes at least one vibration-reducing mechanism configured to isolate a vibratory response of the gearbox from the stationary component.

19 Claims, 3 Drawing Sheets

Related U.S. Application Data

(60) Provisional application No. 62/082,722, filed on Nov. 21, 2014.

(51) Int. Cl.
  *B64D 35/02* (2006.01)
  *F01D 15/12* (2006.01)
  *F01D 25/24* (2006.01)

(56) References Cited

U.S. PATENT DOCUMENTS

| | | | |
|---|---|---|---|
| 3,632,222 A | 1/1972 | Cronstedt | |
| 4,441,313 A | 4/1984 | Joubert | |
| 4,829,850 A | 5/1989 | Soloy | |
| 4,875,655 A * | 10/1989 | Bender | F02C 7/20 248/557 |
| 5,390,878 A | 2/1995 | Padden | |
| 5,460,238 A | 10/1995 | Burke et al. | |
| 5,809,843 A * | 9/1998 | Barger | F16F 15/02 74/574.4 |
| 5,873,547 A | 2/1999 | Dunstan | |
| 6,260,351 B1 | 7/2001 | Delano et al. | |
| 6,328,293 B1 | 12/2001 | Olsen | |
| 6,708,925 B2 | 3/2004 | Udall | |
| 7,156,343 B2 | 1/2007 | Marche | |
| 7,232,091 B2 * | 6/2007 | Marche | B64D 27/26 244/54 |
| 7,784,778 B2 | 8/2010 | Sanetick | |
| 7,950,605 B2 | 5/2011 | Howard et al. | |
| 8,001,764 B2 | 8/2011 | Parks | |
| 8,256,707 B2 | 9/2012 | Suciu | |
| 8,474,804 B2 | 7/2013 | Masterson | |
| 8,529,197 B1 | 9/2013 | Coffin | |
| 8,561,501 B2 | 10/2013 | Niggemeier et al. | |
| 10,124,905 B2 | 11/2018 | Barsali | |
| 2003/0005705 A1 | 1/2003 | Chan | |
| 2013/0067931 A1 | 5/2013 | Hindle | |
| 2013/0119192 A1 * | 5/2013 | Pula | B64C 27/001 244/54 |
| 2013/0160459 A1 * | 6/2013 | Thies | B64D 33/00 60/796 |
| 2013/0259655 A1 | 10/2013 | Coffin | |
| 2014/0174252 A1 | 6/2014 | Davis et al. | |
| 2015/0033890 A1 | 2/2015 | Pettinotti | |
| 2016/0167797 A1 | 6/2016 | Stretton | |

\* cited by examiner

TURBINE ENGINE ASSEMBLY AND METHOD OF MANUFACTURING THEREOF

CROSS-REFERENCE TO RELATED APPLICATIONS

This non-provisional application is a continuation of U.S. patent application Ser. No. 14/943,653, entitled "TURBINE ENGINE ASSEMBLY AND METHOD OF MANUFACTURING THEREOF", filed Nov. 17, 2015, which is herein incorporated in its entirety by reference, which claims the benefit of priority under 35 U.S.C. § 119(e) to U.S. Provisional Patent Application No. 62/082,722, entitled "TURBINE ENGINE ASSEMBLY AND METHOD OF MANUFACTURING THEREOF", filed Nov. 21, 2014, which is herein incorporated in its entirety by reference.

BACKGROUND

The present disclosure relates generally to speed-reducing gearbox assemblies for use with turbine engines and, more specifically, to systems and methods of reducing vibratory responses induced into at least one of an engine and an airframe from a gearbox assembly.

At least some known gas turbine engines, such as turbofans, include a fan, a core engine, and a power turbine. The core engine includes at least one compressor, a combustor, and a high-pressure turbine coupled together in a serial flow relationship. More specifically, the compressor and high-pressure turbine are coupled through a shaft to form a high-pressure rotor assembly. Air entering the core engine is mixed with fuel and ignited to form a high energy gas stream. The high energy gas stream flows through the high-pressure turbine to rotatably drive the high-pressure turbine such that the shaft rotatably drives the compressor. The gas stream expands as it flows through a power or low-pressure turbine positioned aft of the high-pressure turbine. The low-pressure turbine includes a rotor assembly having a fan coupled to a drive shaft. The low-pressure turbine rotatably drives the fan through the drive shaft, and turbine engine performance is enhanced when the low-pressure turbine operates at a relatively high rotational speed and when the fan operates at a relatively low rotational speed and with a low pressure ratio.

Many modern commercial turbofans are manufactured with increasingly large bypass ratios to facilitate improving engine efficiency. However, increasing the bypass ratio of the turbofan results in an increased fan size and fan tip speed, which must be controlled to maintain the efficiency of the turbofan. As such, at least some known turbofans include a speed-reducing gearbox coupled along the drive shaft between the low-pressure turbine and the fan, such that the fan rotates at a different speed than the low-pressure turbine. However, speed-reducing gearboxes generally increase the weight and the complexity of the turbofan, induce vibrations to the propulsion system or the airframe of an associated aircraft, and increase noise in a passenger cabin of the aircraft. Therefore, it is desired to have a turbofan that induces less vibration and noise to the associated aircraft.

BRIEF DESCRIPTION

In one aspect, a turbine engine assembly includes: a fan assembly; a turbine coupled to the fan assembly through a gearbox; a stationary component; and an assembly extending between the gearbox and the stationary component to couple the gearbox to the stationary component, wherein the assembly includes at least one vibration-reducing mechanism configured to isolate a vibratory response of the gearbox from the stationary component.

In another aspect, a turbine engine assembly includes: a gas turbine engine having a primary flowpath surrounded at least partly by a core cowl; a gearbox mounted within the core cowl and inboard of the primary flowpath; a stationary component; and an assembly extending between the gearbox and the stationary component to couple the gearbox to the stationary component, wherein the assembly includes at least one vibration-reducing mechanism configured to isolate a vibratory response of the gearbox from the stationary component.

In yet another aspect, a turbine engine assembly includes: a gas turbine engine including two or more turbomachinery sections; a gearbox coupling two or more of the turbomachinery sections; a stationary component; and an assembly extending between the gearbox and the stationary component to couple the gearbox to the stationary component, wherein the assembly includes at least one vibration-reducing mechanism configured to isolate a vibratory response of the gearbox from the stationary component.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of the present disclosure relate to turbine engine assemblies including a gearbox and vibration-reducing mechanisms for use in isolating vibrations generated by the gearbox. More specifically, the vibration-reducing mechanisms are positioned in one or more locations such that the vibrations are restricted from being transmitted to structural components of an aircraft, for example. In one embodiment, a vibration-reducing mechanism is coupled between the gearbox and an internal stationary component of the turbine engine, such as a fan hub frame. In another embodiment, vibration-reducing mechanisms are coupled at mounting locations between the turbine engine and structural components of an aircraft, such as a wing or a fuselage. As such, the turbine assemblies described herein facilitate reducing vibrations induced into the aircraft frame from a turbine engine including a gearbox, and facilitate reducing passenger cabin noise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine. It should also be appreciated that the term "fluid" as used herein includes any medium or material that flows, including, but not limited to, air, gas, liquid and steam.

Figure 1:
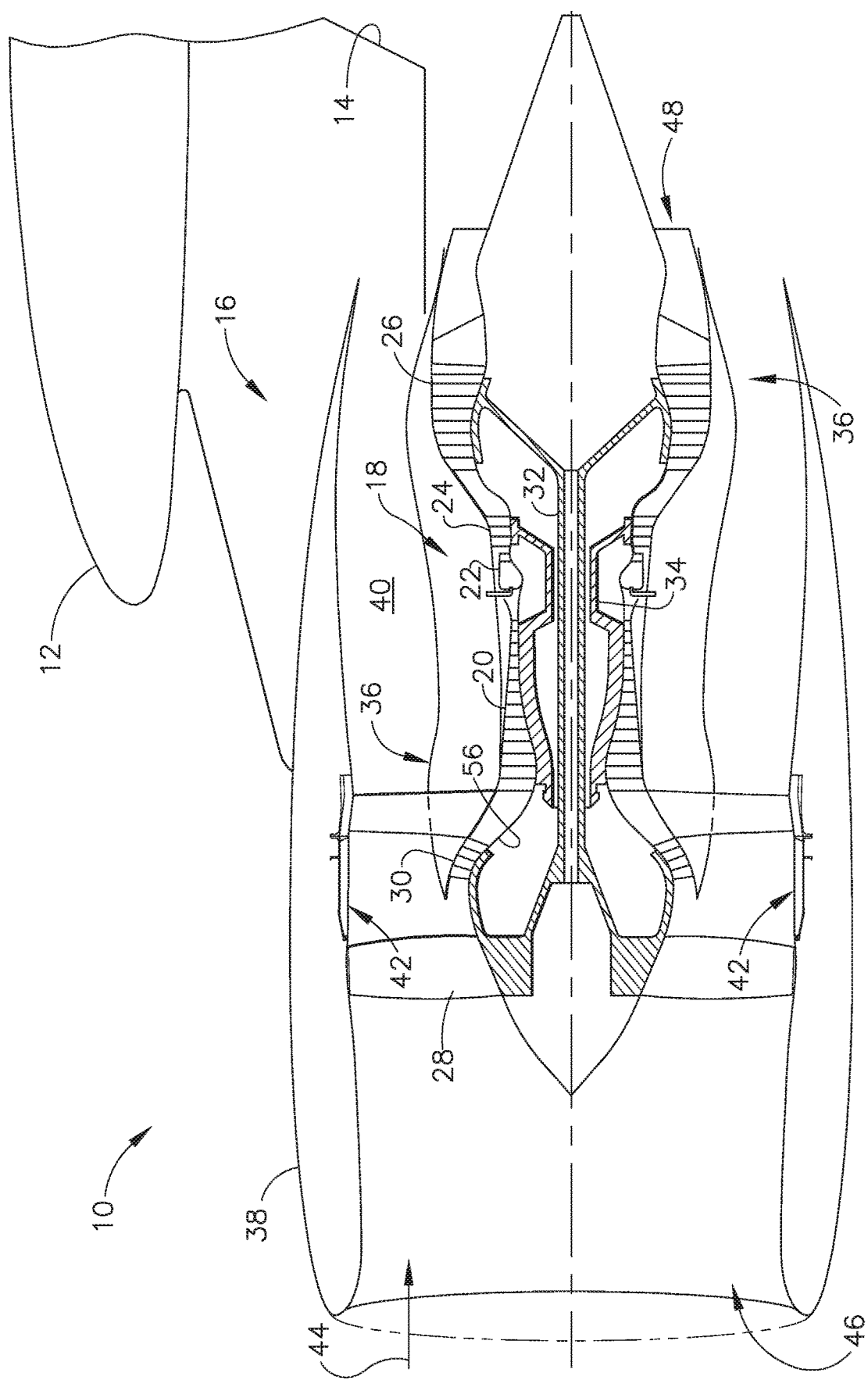
FIG. 1 is a schematic illustration of an exemplary aircraft assembly.

FIG. 1 is a schematic illustration of an exemplary aircraft assembly 10. In the exemplary embodiment, aircraft assembly 10 includes a structural component such as a wing 12, a pylon 14 extending from wing 12, and a turbine engine assembly 16 coupled to pylon 14. Turbine engine assembly 16 includes a core gas turbine engine 18 that includes a high-pressure compressor 20, a combustor 22, and a high-pressure turbine 24. Turbine engine assembly 16 also includes a low-pressure turbine 26 coupled downstream from core gas turbine engine 18, a fan assembly 28 coupled upstream from core gas turbine engine 18, and a booster compressor 30 coupled between fan assembly 28 and core gas turbine engine 18. Low-pressure turbine 26 is coupled to fan assembly 28 and booster compressor 30 via a first drive shaft 32, and high-pressure turbine 24 is coupled to high-pressure compressor 20 via a second drive shaft 34. Core gas turbine engine 18 is enclosed in an annular core cowl 36. A housing 38 is positioned radially outward from and extends circumferentially about fan assembly 28 and a portion of the core cowl 36. An annular bypass duct 40 is defined between core cowl 36 and an inner surface 42 of housing 38. In an alternative embodiment, the structural component is an aircraft fuselage (not shown), and pylon 14 and turbine engine assembly 16 are coupled directly to the fuselage.

In operation, ambient air 44 entering turbine engine assembly 16 through an inlet 46 is channeled through fan assembly 28 towards booster compressor 30. Compressed air is discharged from booster compressor 30 towards high-pressure compressor 20. Highly compressed air is channeled from high-pressure compressor 20 towards combustor 22, mixed with fuel, and the mixture is combusted within combustor 22. High temperature combustion gas generated by combustor 22 is channeled towards turbines 24 and 26. Combustion gas is subsequently discharged from turbine engine assembly 16 via an exhaust 48.

Figure 2:
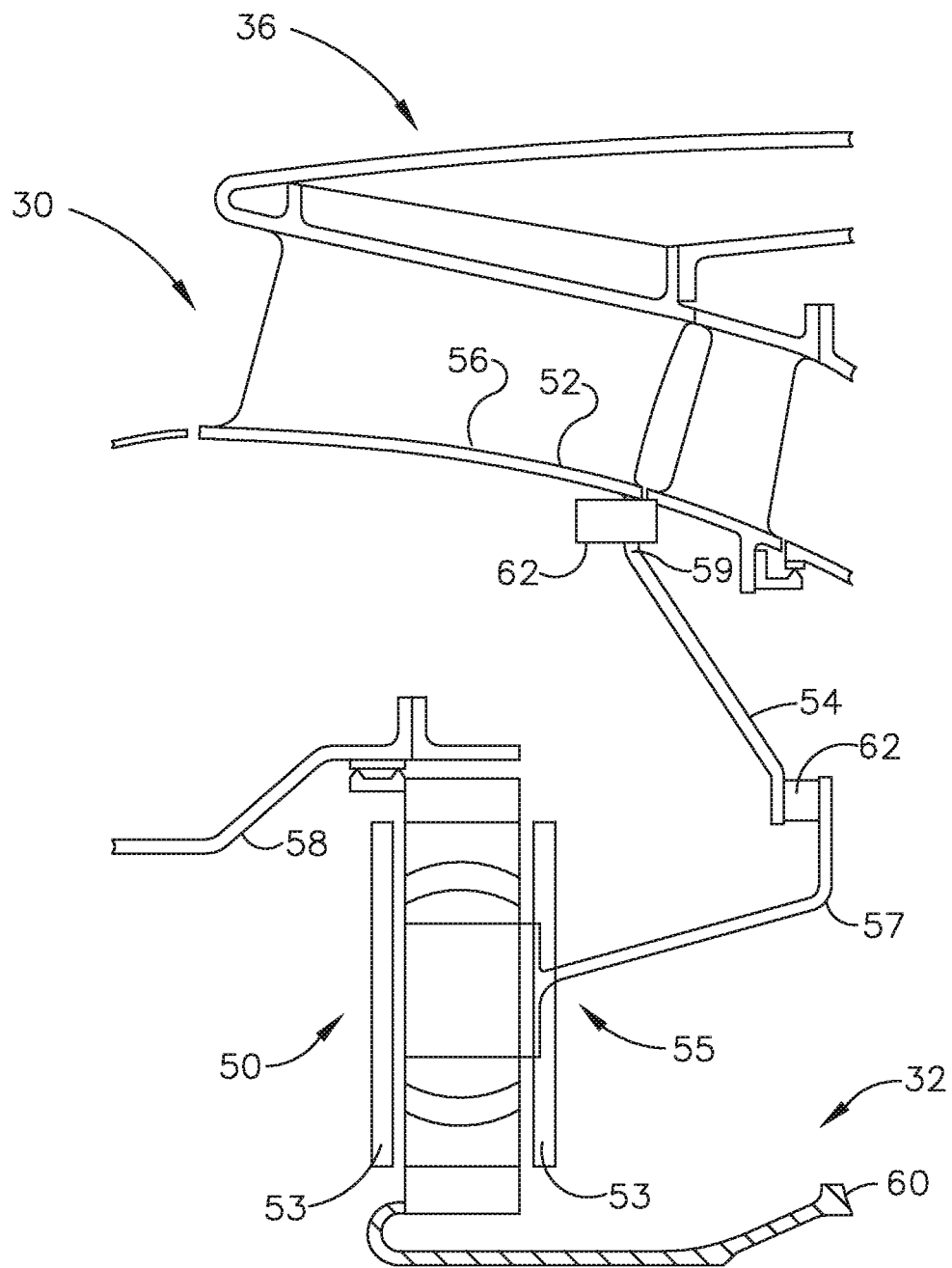
FIG. 2 is an enlarged schematic illustration of a portion of the turbine engine assembly shown in FIG. 1.

FIG. 2 is an enlarged schematic illustration of a portion of turbine engine assembly 16 (shown in FIG. 1). In the exemplary embodiment, turbine engine assembly 16 includes a gearbox 50 coupled along first drive shaft 32. In various embodiments, gearbox 50 includes, but is not limited to, a planetary, star-type gearbox assembly. Gearbox 50 is coupled to a stationary component 52 of turbine engine assembly 16. More specifically, gearbox 50 includes a carrier 53, a torque frame 55 is coupled to carrier 53, and a flex support 57 coupled to torque frame 55. A support member 54 is coupled to flex support 57, and extends towards stationary component 52. For example, in one embodiment, stationary component 52 is embodied in a frame 56 of turbine engine assembly 16. Moreover, gearbox 50 is coupled along first drive shaft 32, thereby defining a first portion 58 extending towards fan assembly 28 (shown in FIG. 1), and defining a second portion 60 extending towards low-pressure turbine 26 (shown in FIG. 1). As such, gearbox 50 facilitates decoupling a rotational speed of fan assembly 28 from a rotational speed of low-pressure turbine 26.

Turbine engine assembly 16 also includes a vibration-reducing mechanism 62 coupled between frame 56 and gearbox 50. More specifically, in one embodiment, vibration-reducing mechanism 62 is coupled between frame 56 and a distal end 59 of support member 54, and facilitates isolating a vibratory response of gearbox 50 from frame 56 as gearbox 50 operates. Alternatively, vibration-reducing mechanism 62 is coupled between support member 54 and flex support 57. Frame 56 is typically coupled, either directly or indirectly, to pylon 14 (shown in FIG. 1). As such, vibration-reducing mechanism 62 facilitates reducing vibrations induced to pylon 14 and aircraft assembly 10 from gearbox 50.

Vibration-reducing mechanism 62 may be any isolator or damping mechanism that enables aircraft assembly 10 to function as described herein. Exemplary vibration-reducing mechanisms include, but are not limited to, a friction damping device (i.e., Coulomb damping), and a biasing device, such as a spring, a metal mesh isolator device, or a device fabricated from an elastomeric material.

Moreover, in operation, gearbox 50 oscillates at a frequency, or range of frequencies, defined by gear mesh oscillations (i.e., the gear mesh frequency) of interconnecting gear teeth (not shown) within gearbox 50. Vibration-reducing mechanism 62 is tuned to reduce the gear mesh frequency, and to ensure frame 56 and the remainder of aircraft assembly 10 is isolated from the vibratory response of gearbox 50. In some embodiments, vibration-reducing mechanism 62 is tuned to oscillate at an anti-resonance frequency of the gear mesh frequency.

Figure 3:
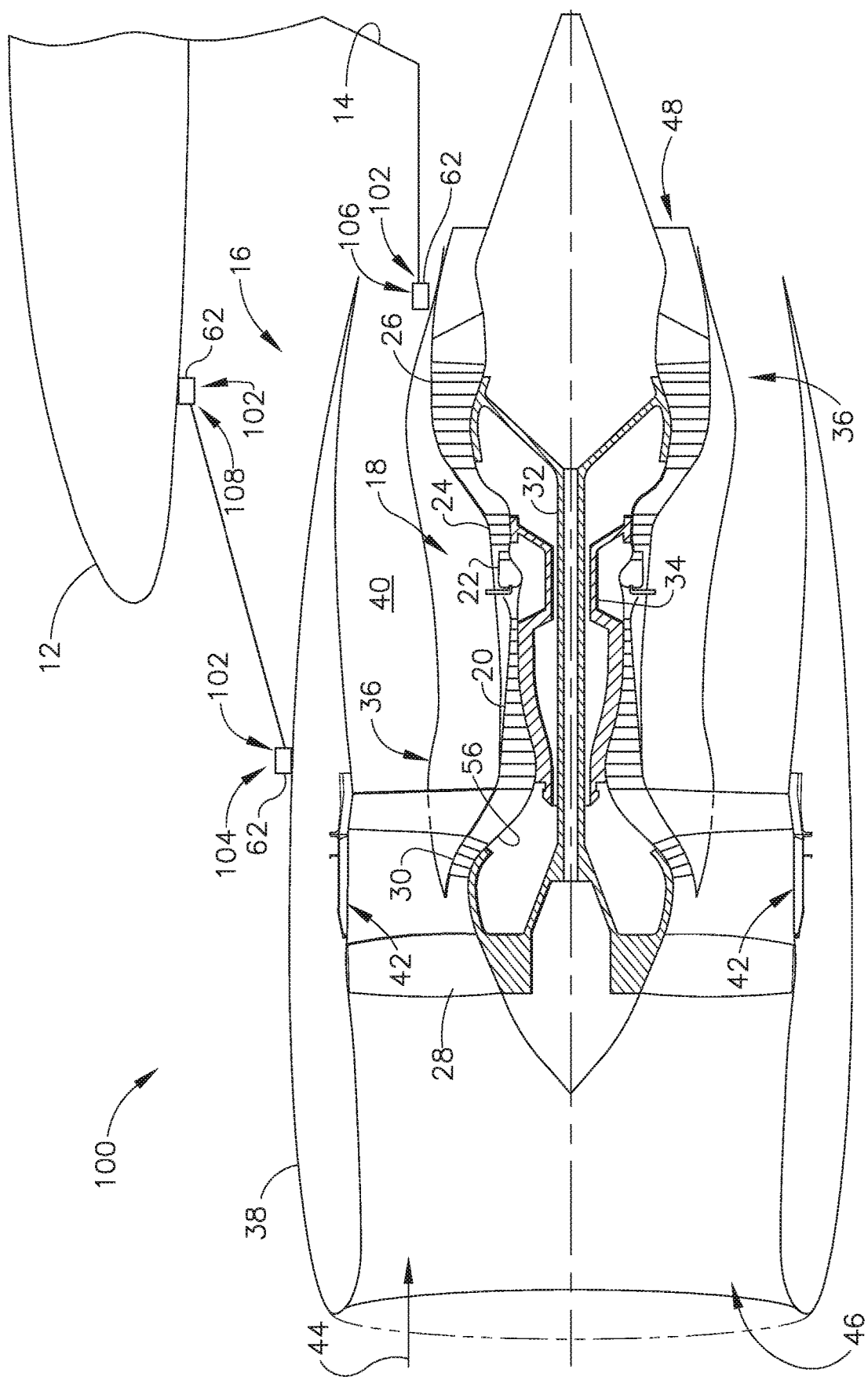
FIG. 3 is a schematic illustration of an alternative aircraft assembly.

FIG. 3 is a schematic illustration of an alternative aircraft assembly 100. In the exemplary embodiment, aircraft assembly 100 includes a structural component such as wing 12, pylon 14 extending from wing 12, and turbine engine assembly 16 coupled to pylon 14. More specifically, turbine engine assembly 16 is mounted to pylon 14 and pylon 14 is mounted to wing 12 at one or more mounting locations 102. For example, a first mounting location 104 is defined between housing 38 and pylon 14, a second mounting location 106 is defined between core cowl 36 and pylon 14, and a third mounting location 108 is defined between wing 12 and pylon 14. Vibration-reducing mechanisms 62 are positioned at one or more mounting locations 102 to facilitate isolating a vibratory response of turbine engine assembly 16, including gearbox 50 (shown in FIG. 2), from wing 12 as gearbox 50 operates. Alternatively, when pylon 14 and turbine engine assembly 16 are coupled directly to a fuselage (not shown) of aircraft assembly 100, one or more mounting locations 102 are located between pylon 14 and the fuselage.

In the exemplary embodiment, support member 54 of gearbox 50 (each shown in FIG. 2) is coupled directly to frame 56 without vibration-reducing mechanism 62 positioned therebetween. As such, in operation, gearbox 50 oscillates at a gear mesh frequency, and the oscillations are transmitted into turbine engine assembly 16 via frame 56. To isolate the vibratory response of turbine engine assembly 16 from wing 12, vibration-reducing mechanisms 62 at mounting locations 102 are tuned to reduce the gear mesh frequency. In some embodiments, vibration-reducing mechanisms 62 are tuned to oscillate at an anti-resonance frequency of the gear mesh frequency. As such, locating vibration-reducing mechanisms 62 at mounting locations 102 facilitates restricting vibrations from being transmitted into wing 12.

The turbine engine assembly and methods described herein relate to turbine engines that include vibration-reducing mechanisms in predetermined locations that facilitate isolating an airframe from a source of vibration. In the exemplary embodiment, the source of vibration is the turbine engine and, more specifically, is a speed-reducing gearbox positioned within the turbine engine. The vibration-reducing mechanisms are located either within the turbine engine, or between the turbine engine and structural components of an aircraft. As such, the turbine engine assemblies described herein facilitate restricting vibrations from being transmitted to an airframe, which reduces passenger cabin noise, tactile vibration, and the likelihood of fatigue damage from being induced to structural components of the airframe.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine assembly, comprising:
   a fan assembly having a centerline axis;
   a turbine coupled to the fan assembly through a gearbox;
   a stationary component;
   a core cowl extending circumferentially around the stationary component and separating an engine inlet and an annular bypass duct, wherein the engine inlet is defined between the stationary component and the core cowl; and
   an assembly extending between the gearbox and the stationary component to couple the gearbox to the stationary component, wherein an entirety of the assembly is located radially inward of the engine inlet with respect to the centerline axis and the assembly includes:
      first and second support members connected in series between the gearbox and the stationary component to couple the gearbox to the stationary component; and
      at least one vibration-reducing mechanism configured to isolate a vibratory response of the gearbox from the stationary component,
   wherein the first and second support members are located radially outward of the centerline axis.

2. The turbine engine assembly in accordance with claim 1, wherein the stationary component comprises a frame.

3. The turbine engine assembly in accordance with claim 1, wherein the gearbox is coupled along a drive shaft comprising a first portion extending towards the fan assembly and a second portion extending towards the turbine.

4. The turbine engine assembly in accordance with claim 1, wherein the gearbox is configured to oscillate at a frequency, and the vibration-reducing mechanism is configured to oscillate at an anti-resonance frequency of the frequency.

5. The turbine engine assembly in accordance with claim 4, wherein the gearbox is configured to oscillate at the frequency defined by gear mesh oscillations.

6. The turbine engine assembly in accordance with claim 1, wherein the vibration-reducing mechanism comprises at least one of a biasing device or a damping device.

7. The turbine engine assembly in accordance with claim 1, further comprising a housing positioned radially outward from and circumferentially around the fan assembly and a portion of the core cowl, the annular bypass duct defined between the core cowl and the housing, wherein the assembly is inboard of the core cowl and the annular bypass duct.

8. A turbine engine assembly, comprising:
   a gas turbine engine having:
      a primary flowpath surrounded at least partly by a core cowl having a centerline axis; and
      an annular bypass duct surrounding the core cowl and separated from the primary flowpath by the core cowl;
   a gearbox mounted within the core cowl and inboard of the primary flowpath;
   a stationary component; and
   an assembly extending between the gearbox and the stationary component to couple the gearbox to the stationary component, wherein an entirety of the assembly is located radially inward of the primary flowpath with respect to the centerline axis and the assembly:
      first and second support members connected in series between the gearbox and the stationary component to couple the gearbox to the stationary component; and
      at least one vibration-reducing mechanism configured to isolate a vibratory response of the gearbox from the stationary component,
   wherein the first and second support members are located radially outward of the centerline axis.

9. The turbine engine assembly in accordance with claim 8, wherein the stationary component comprises a frame.

10. The turbine engine assembly in accordance with claim 8, wherein the gearbox is coupled along a drive shaft comprising a first portion extending towards a fan assembly and a second portion extending towards a turbine.

11. The turbine engine assembly in accordance with claim 8, wherein the gearbox is configured to oscillate at a frequency, and the vibration-reducing mechanism is configured to oscillate at an anti-resonance frequency of the frequency.

12. The turbine engine assembly in accordance with claim 11, wherein the gearbox is configured to oscillate at the frequency defined by gear mesh oscillations.

13. The turbine engine assembly in accordance with claim 8, wherein the vibration-reducing mechanism comprises at least one of a biasing device or a damping device.

14. A turbine engine assembly comprising:
   a gas turbine engine including two or more turbomachinery sections, the gas turbine engine having a centerline axis;
   a gearbox coupling two or more of the turbomachinery sections;
   a stationary component;
   a core cowl extending circumferentially around the stationary component and separating an engine inlet and an annular bypass duct, wherein the engine inlet is defined between the stationary component and the core cowl; and
   an assembly located radially inward of the engine inlet and extending between the gearbox and the stationary component to couple the gearbox to the stationary component, wherein an entirety of the assembly is located radially inward of the engine inlet with respect to the centerline axis and the assembly includes:
  first and second support members connected in series between the gearbox and the stationary component to couple the gearbox to the stationary component; and
  at least one vibration-reducing mechanism configured to isolate a vibratory response of the gearbox from the stationary component,
wherein the first and second support members are located radially outward of the centerline axis.

15. The turbine engine assembly in accordance with claim 14, wherein the stationary component comprises a frame.

16. The turbine engine assembly in accordance with claim 14, wherein the gearbox is coupled along a drive shaft comprising a first portion extending towards a fan assembly and a second portion extending towards a turbine.

17. The turbine engine assembly in accordance with claim 14, wherein the gearbox is configured to oscillate at a frequency, and the vibration-reducing mechanism is configured to oscillate at an anti-resonance frequency of the frequency.

18. The turbine engine assembly in accordance with claim 17, wherein the gearbox is configured to oscillate at the frequency defined by gear mesh oscillations.

19. The turbine engine assembly in accordance with claim 14, wherein the vibration-reducing mechanism comprises at least one of a biasing device or a damping device.

\* \* \* \* \*